United States Patent [19]

Ståhle et al.

[11] Patent Number: 5,936,569
[45] Date of Patent: Aug. 10, 1999

[54] METHOD AND ARRANGEMENT FOR ADJUSTING ANTENNA PATTERN

[75] Inventors: Lauri Ståhle, Espoo; Jari Pekkarinen, Oulu, both of Finland; Esko Erkkilä, Solana Beach, Calif.

[73] Assignee: Nokia Telecommunications Oy, Espoo, Finland

[21] Appl. No.: 08/982,693

[22] Filed: Dec. 2, 1997

[51] Int. Cl.⁶ ........................................................ G01S 7/40
[52] U.S. Cl. ........................... 342/174; 342/173; 342/372
[58] Field of Search ............................... 342/372, 173, 342/174

[56] References Cited

U.S. PATENT DOCUMENTS 5,412,414  5/1995  Ast et al. .................................. 342/174
5,739,784  4/1998  Jan et al. ................................. 342/354
5,754,139  5/1998  Turcotte et al. ......................... 342/373

*Primary Examiner*—Theodore M. Blum
*Attorney, Agent, or Firm*—Pillsbury Madison & Sutro LLP

[57] ABSTRACT

A method and an arrangement for adjusting an antenna, pattern particularly in an SDMA system where a transmitter and a receiver include at least two antennas. Baseband antenna signals are multiplied by coefficients shaping the antenna pattern in order to produce a desired antenna pattern. The phase and strength of a baseband antenna signal are measured. On the basis of the measurement, the differences in phase and strength between the antenna signals are compensated by adjusting the coefficients shaping the antenna pattern.

28 Claims, 1 Drawing Sheet

METHOD AND ARRANGEMENT FOR ADJUSTING ANTENNA PATTERN

FIELD OF THE INVENTION

The invention relates to radio systems and, more precisely, to a Spatial Division Multiple Access (SDMA) radio system.

BACKGROUND OF THE INVENTION

In an SDMA method, users are distinguished from one another according to their location. This is achieved by adjusting the beams of receiver antennas at the base station to the desired directions according to the location of mobile stations. For this purpose, adaptive antenna arrays, or phased antennas, are used together with signal processing, which enables monitoring the mobile stations.

In a CDMA method, which is often used in the SDMA system, a narrowband data signal of the user is multiplied by a spreading code of a considerably broader band than the data signal and spread over a relatively broad band. Bandwidths of more than 1 MHz are used. Multiplying the data signal spreads it over the whole band used. Simultaneous users share the same frequency band for transmission. A separate spreading code is used in each connection between a base station and a mobile station, and the signals of the different users can be distinguished in the receivers from one another on the basis of each user's spreading code.

In a base station of the SDMA radio system in particular, signal reception and transmission are performed using an antenna array comprising several antenna elements. Each antenna element is typically connected to one transceiver unit. The signals transmitted and received in a common baseband unit are phased in relation to each other in order to have the antenna array produce a radiation pattern of a desired form. A typical antenna pattern consists of a narrow main beam and several side beams. The direction and width of the main beam can be adjusted by phasing the radio frequency signal of each element. In practice, the phasing is performed by multiplying the digitized baseband antenna signal of each antenna element by complex coefficients shaping the antenna pattern.

A good antenna pattern is produced e.g., when the phase and strength of each antenna signal are identical. This kind of situation is, however, usually not possible because the nonidealities and environment of electronic components have an effect on the transceiver unit. This causes relative differences in phase and strength between the antenna signals, which cause side beams and degradation of the main beam. This in turn, leads to interference harmful to the base station and the whole radio system and to reduced radio coverage.

SUMMARY OF THE INVENTION

The object of the invention is thus to provide a method and an arrangement implementing the method so as to enable solving the above problems. This is achieved by means of a method described for adjusting an antenna pattern in a radio system where a transmitter and a receiver include at least two antennas, the method comprising: multiplying a baseband antenna signal by coefficients shaping the antenna pattern in order to produce a desired antenna pattern, measuring the phase and strength of the baseband antenna signal, and compensating on the basis of the measurement for phase and strength differences between the antenna signals by adjusting the coefficients shaping the antenna pattern.

The objectives are also achieved by an arrangement implementing the method for adjusting an antenna pattern in a radio system where a transmitter and a receiver comprise at least two antennas, the baseband antenna signal of which is multiplied by coefficients shaping the antenna pattern in order to produce a desired antenna pattern, the arrangement being adjusted to measure the phase and strength of the baseband antenna signal and to compensate on the basis of the measurement for differences of phase and strength between the antenna signals by adjusting the coefficients shaping the antenna pattern.

Several advantages are gained by the method and the arrangement of the invention. Processing of a digital baseband signal instead of an analog signal, which is a prior art solution, is more precise than the known solutions and thus produces both an improved antenna pattern and higher quality connections in the radio system. It also minimizes the amount of analog RF hardware and there is no need for components different from conventional transceiver components. In addition, adjusting the antenna pattern is also possible during normal traffic.

BRIEF DESCRIPTION OF THE DRAWINGS

The invention is now described in more detail in connection with preferred embodiments with reference to the attached drawings, in which.

DETAILED DESCRIPTION OF PREFERRED EMBODIMENTS THE INVENTION

The solution according to the invention is applicable to radio systems using directional antennas, of which an SDMA cellular radio system is one example, the invention not being, however, restricted to it. In addition, a CDMA technique is applied to a preferred embodiment of the invention. The solution of the invention is particularly suitable for use at a base station of the radio system.

Using SDMA together with CDMA is advantageous. In SDMA, a signal is transmitted and received using an antenna array and, by means of digital signal processing, it is processed in such a way that the directional patterns of the antennas are as desired. In prior art solutions, the processing of antenna signals is often performed in order to maximize the signal/interference ratio of the signal desired. The received signal can also be processed in such a way that the directional pattern of the antenna array minimizes the interference caused by other connections in the desired signal.

Figure 1:
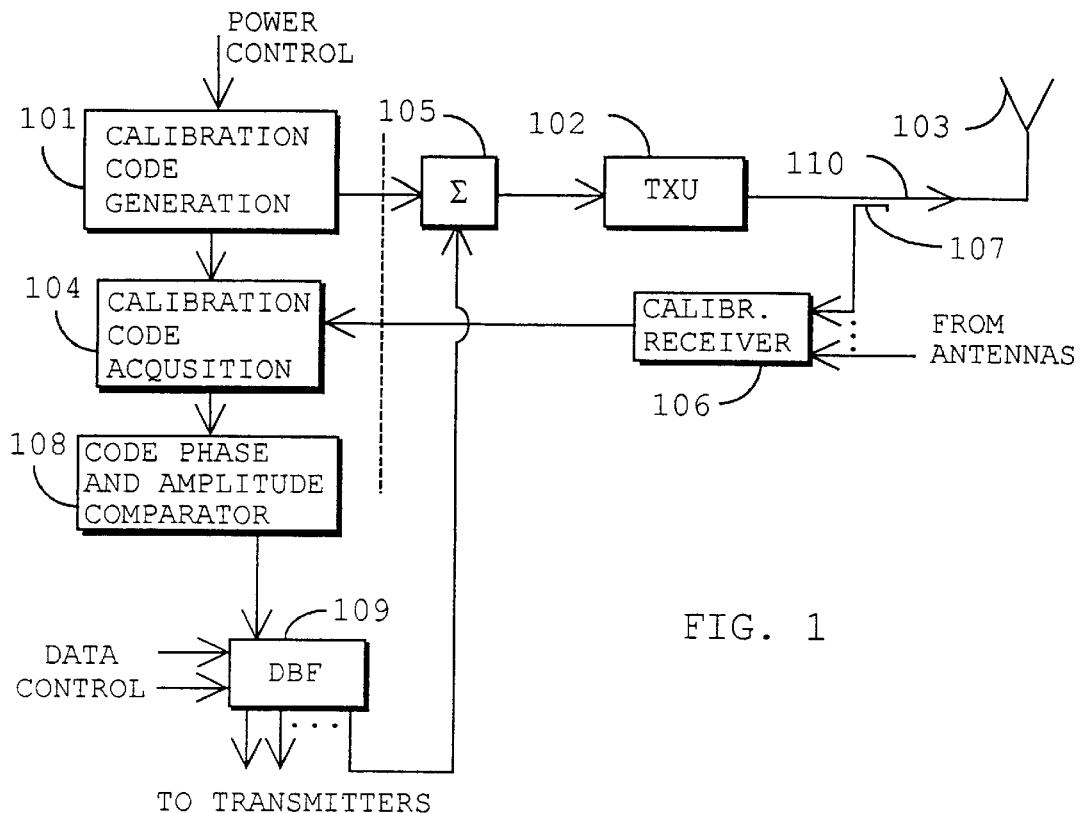
FIG. 1 shows an arrangement for adjusting a transmitter antenna pattern.

FIG. 1 shows a block diagram of a transmitter group in an antenna array conforming to the invention. A transmitter comprises calibration code generator 101, transmitter unit 102, antenna 103, detector 104, summer 105, receiver unit 106, contact 107, comparator 108 and controller 109, which is preferably a digital beam former. The antenna array comprises several transmitters to which an inventive feedback reception arrangement 106–109 adjusting the transmitters is connected. In the CDMA system in particular, calibration code generator 101 sends a calibration code, which is similar to a spreading code in the CDMA system and preferably a pilot signal and the phase and amplitude of which are known. The calibration code proceeds to transmitter unit 102, which e.g. multiplies the calibration code to generate radio frequency antenna signal 110. Antenna signal 110 is transferred both to antenna 103, and via contact 107, to receiver unit 106, In receiver unit 106 the antenna signal is, for instance, multiplied to generate a baseband signal and digitized. This is done to all antenna signals 110 of antennas 103 in the antenna array. The digital calibration code signal further proceeds to detector 104, which detects the calibration code and produces, at the same time, code phase and strength data of the antenna signal. Strength is measured from signal amplitude or power by means of the calibration code. Comparator 108 compares and measures the phases and strengths of antenna signals 110 in different antenna elements 103, and the resulting differences are transferred to controller 109, which adjusts coefficients changing the phase and strength of antenna signal 110 assigned to each transmitter unit 102 in the antenna array. This way the antenna pattern the antenna array uses for transmission is adjusted precisely to the desired form. Data and control signals are also sent via transmitter unit 102, after they have first been phased and their amplitude has been adjusted in controller 109 on the basis of the measurement, by summing them with the calibration code in summer 105.

Figure 2:
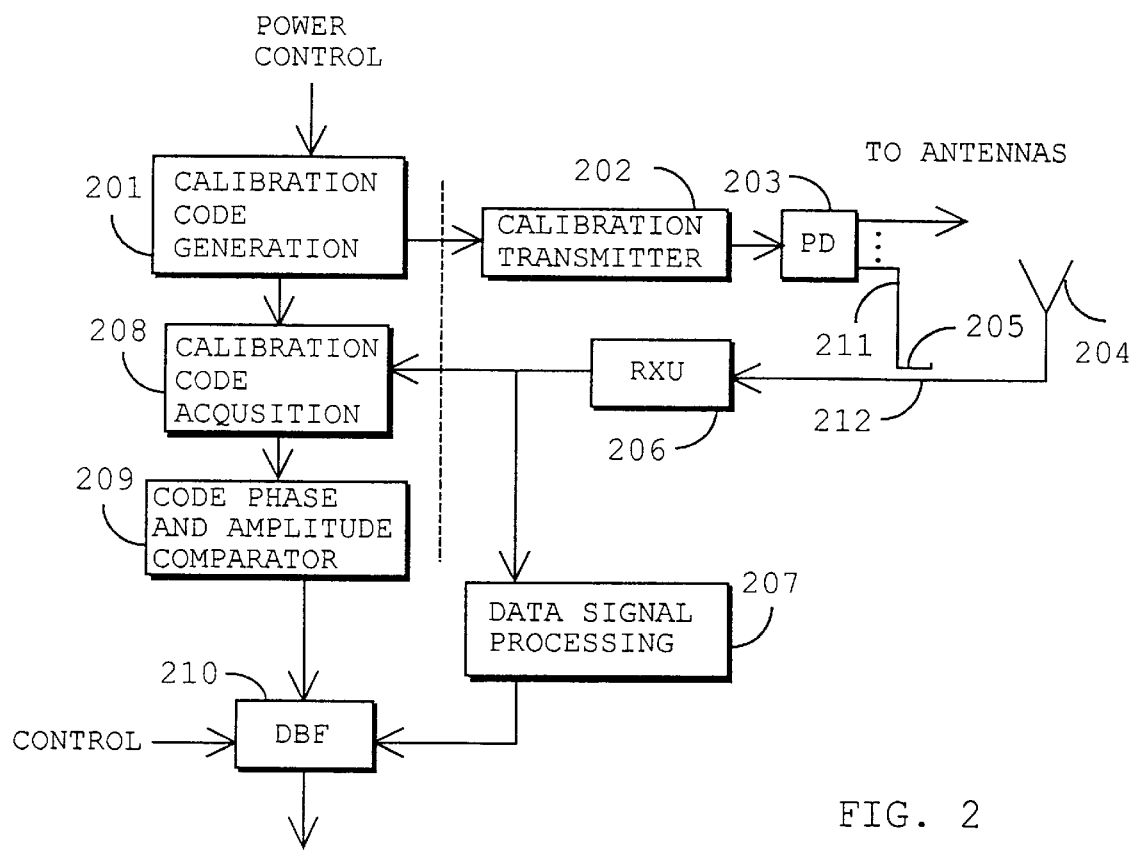
FIG. 2 shows an arrangement for adjusting a receiver antenna pattern.

FIG. 2 is a block diagram of a receiver structure. The receiver comprises specific calibration code transmitter 201–203, which includes calibration code generator 201, transmitter unit 202 and power distributor 203, antenna 204, contact 205, receiver unit 206, signal processing means 207, detector 208, comparator 209 and controller 210, which is preferably a digital beam former. Calibration code transmitter 201–203 sends a calibration code of a predetermined phase and strength to each antenna 204 in a receiver array. In this process, the calibration code proceeds from calibration code generator 201 to specific transmitter unit 202, which e.g. multiplies the calibration code to generate radio frequency antenna signal 211. Radio frequency antenna signal 211 is divided by a power distributor 203 to all receiver units 206. Antenna signal 211 is then transferred via contacts 205 to receivers as antenna signal 212, which proceeds to receiver units 206 in each receiver. Receiver unit 206 converts radio frequency signal 212 back to a baseband signal and digitizes it. Detector 208 indicates the calibration code from the digital signal and produces the phase and strength data of the antenna signal by means of the calibration code. The phase and strength data relating to signal 212 received by each antenna element are transferred to comparator 209, which compares and measures the signal phases and strengths, and the differences between the phase and strength data are transferred to controller 210, which controls and adjusts the amplitude and phasing in each antenna element by means of complex coefficients shaping the antenna pattern. An actual data signal received is processed in signal processing means 207 before digital beam processing in controller 210. Means 207 e.g., despread the signal.

In a solution conforming to the invention, the phase and strength data of an individual, freely selected antenna signal are used as a reference value in relation to other antenna signals because only the relative differences between the phases and strengths of the antenna signals are essential. The phase and strength data of the antenna signals can be measured substantially simultaneously or sequentially. When the phases and strengths of several antenna signals are measured simultaneously, a different calibration code is preferably applied to each antenna. As regards sequential measurement, the same calibration code is preferably used as the antenna signal for each antenna.

Since the calibration code signal is connected as an antenna signal by contacts 107 and 205, and not transmitted by air, the power of the calibration code signal can be maintained considerably low. This also allows performing measurements simultaneously with other traffic, in which case the strength of the calibration code signal is controlled and kept essentially lower than the strength of the actual payload signals used in the traffic. In a preferred embodiment of the invention, the strength of the calibration code signal is maintained at a fixed level in relation to the strength of the payload signals used in the traffic. A CDMA pilot signal is preferably used as the calibration code signal in radio systems sending pilot signals.

Although the invention is described above with reference to an example given in the attached drawings, it is evident that the invention is not restricted to it, but diverse variations of the invention are possible within the inventive idea presented in the attached claims.

We claim:

1. A method for adjusting an antenna pattern for an antenna array of a plurality of antennas, which is effectively connected to at least one of a plurality of transmitters for transmitting antenna signals, and a plurality of receivers for receiving antenna signals, comprising:

(a) for each antenna, multiplying a respective antenna signal by coefficients for shaping an antenna pattern of the antenna array to produce a first iteration of a desired antenna pattern;

(b) acquiring and forming from each antenna signal as being used to produce said desired antenna pattern a respective digitized baseband signal having a phase and a strength; measuring the phase and strength of each said digitized baseband signal, and thereby determining differences among the phases and strengths of the respective digitized baseband signals; and (c) compensating for said differences by adjusting said coefficients, to produce a subsequent iteration of said desired antenna pattern.

2. The method of claim 1, wherein:

for adjusting said antenna array for use in transmitting antenna signals, step (a) includes transmitting through each said transmitter a respective calibration code signal having a known phase and a known strength and substantially corresponds to a CDMA spreading code.

3. The method of claim 1, wherein:

for adjusting said antenna array for use in receiving antenna signals, step (a) includes transmitting to each said receiver a respective calibration code signal having a known strength and a known phase and substantially corresponds to a CDMA spreading code.

4. The method of claim 1, wherein:

said measuring comprises using the phase and strength of one said digitized baseband signal as reference valves for determining said differences.

5. The method of claim 1, wherein:

said measuring comprises measuring the phase and strength for at least two of said digitized baseband signals simultaneously with one another.

6. The method of claim 1, wherein:

said measuring comprises measuring the phase and strength for at least two of said digitized baseband signals sequentially.

7. The method of claim 1, wherein:

for adjusting said antenna array for use in transmitting antenna signals, step (a) includes transmitting through each said transmitter a respective calibration code signal having a known phase and a known strength and substantially corresponds to a CDMA spreading code;

for adjusting said antenna array for use in receiving antenna signals, step (a) includes transmitting to each said receiver a respective calibration code signal having a known strength and a known phase and substantially corresponds to a CDMA spreading code;

said measuring comprises measuring the phase and strength for at least two of said digitized baseband signals simultaneously with one another;

said transmitting through each said transmitter a respective calibration code signal and said transmitting to each said receiver a respective calibration code signal comprises using for each said antenna a respective different calibration code to provide each of the respective calibration code signals.

8. The method of claim 1, wherein:

for adjusting said antenna array for use in transmitting antenna signals, step (a) includes transmitting through each said transmitter a respective calibration code signal having a known phase and a known strength and substantially corresponds to a CDMA spreading code;

for adjusting said antenna array for use in receiving antenna signals, step (a) includes transmitting to each said receiver a respective calibration code signal having a known strength and a known phase and substantially corresponds to a CDMA spreading code;

said measuring comprises measuring the phase and strength for at least two of said digitized baseband signals sequentially;

said transmitting through each said transmitter a respective calibration code signal and said transmitting to each said receiver a respective calibration code signal comprises using for each said antenna same calibration code to provide the respective calibration to provide all of the respective calibration code signals.

9. The method of claim 2, further comprising:

while adjusting said antenna array for use in transmitting antenna signals, using said transmitters for transmitting payload data via said antennas at respective powers which are substantially higher than those of said calibration code signals.

10. The method of claim 3, further comprising:

while adjusting said antenna array for use in receiving antenna signals, using said receivers for receiving payload data via said antennas at respective powers which are substantially higher than those of said calibration code signals.

11. The method of claim 2, further comprising:

while adjusting said antenna array for use in transmitting antenna signals, using said transmitters for transmitting payload data via said antennas at respective powers in respect to which said calibration code signals are maintained at a fixed level.

12. The method of claim 3, further comprising:

while adjusting said antenna array for use in receiving antenna signals, using said receivers for receiving payload data via said antennas at respective powers in respect to which said calibration code signals are maintained at a fixed level.

13. The method of claim 2, wherein:

each said calibration code signal comprises a CDMA pilot signal.

14. The method of claim 3, wherein:

each said calibration code signal comprises a CDMA pilot signal.

15. An arrangement for adjusting an antenna pattern for an antenna array of a plurality of antennas, which is effectively connected to at least one of a plurality of transmitters for transmitting antenna signals, and a plurality of receivers for receiving antenna signals, comprising:

(a) A multiplier means serving for each antenna, for multiplying a respective antenna signal by coefficients for shaping an antenna pattern of the antenna array to produce a first iteration of a desired antenna pattern;

(b) means for acquiring and forming from each antenna signal as being used to produce said desired antenna pattern a respective digitized baseband signal having a phase and a strength; measuring means for measuring the phase and strength of each said digitized baseband signal, and thereby determining differences among the phases and strengths of the respective digitized baseband signals; and (c) compensating means for compensating for said differences by adjusting said coefficients, to produce a subsequent iteration of said desired antenna pattern.

16. The arrangement of claim 15, wherein:

for adjusting said antenna array for use in transmitting antenna signals, said multiplying means includes means for transmitting through each said transmitter a respective calibration code signal having a known phase and a known strength and substantially corresponds to a CDMA spreading code.

17. The arrangement of claim 15, wherein:

for adjusting said antenna array for use in receiving antenna signals, said multiplying means includes means for transmitting to each said receiver a respective calibration code signal having a known strength and a known phase and substantially corresponds to a CDMA spreading code.

18. The arrangement of claim 15, wherein:

said measuring means is arranged for using the phase and strength of one said digitized baseband signal as reference valves for determining said differences.

19. The arrangement of claim 15, wherein:

said measuring means is arranged for measuring the phase and strength for at least two of said digitized baseband signals simultaneously with one another.

20. The arrangement of claim 15, wherein:

said measuring means is arranged for measuring the phase and strength for at least two of said digitized baseband signals sequentially.

21. The arrangement of claim 15, wherein:

for adjusting said antenna array for use in transmitting antenna signals, said multiplying means includes means for transmitting through each said transmitter a respective calibration code signal having a known phase and a known strength and substantially corresponds to a CDMA spreading code;

for adjusting said antenna array for use in receiving antenna signals, said multiplying means includes means for transmitting to each said receiver a respective calibration code signal having a known strength and a known phase and substantially corresponds to a CDMA spreading code;

said measuring means is arranged for measuring the phase and strength for at least two of said digitized baseband signals simultaneously with one another; and said means for transmitting is arranged for transmitting through each said transmitter a respective calibration code signal and said means transmitting to each said receiver a respective calibration code signal is arranged for using for each said antenna respective different calibration code to provide each of the respective calibration code signals.

22. The arrangement of claim 15, wherein:

for adjusting said antenna array for use in transmitting antenna signals, said multiplying means includes means for transmitting through each said transmitter a respective calibration code signal having a known phase and a known strength and substantially corresponds to a CDMA spreading code;

for adjusting said antenna array for use in receiving antenna signals, said multiplying means includes means for transmitting to each said receiver a respective calibration code signal having a known strength and a known phase and substantially corresponds to a CDMA spreading code;

said measuring means is arranged for measuring the phase and strength for at least two of said digitized baseband signals simultaneously with one another; and said means for transmitting is arranged for transmitting through each said transmitter a respective calibration code signal and said means transmitting to each said receiver a respective calibration code signal is arranged for using for each said antenna same calibration code to provide the respective calibration to provide all of the respective calibration code signals.

23. The arrangement of claim 16, further comprising:

while adjusting said antenna array for use in transmitting antenna signals, said transmitters and transmitting means are arranged respectively for transmitting payload data via said antennas at respective powers which are substantially higher than those of said calibration code signals.

24. The arrangement of claim 17, further comprising:

while adjusting said antenna array for use in receiving antenna signals, said receivers and said transmitting means are arranged respectively for receiving payload data via said antennas at respective powers which are substantially higher than those of said calibration code signals.

25. The arrangement of claim 16, further comprising:

while adjusting said antenna array for use in transmitting antenna signals, said transmitters and transmitting means are arranged respectively for transmitting payload data via said antennas at respective powers in respect to which said calibration code signals are maintained at a fixed level.

26. The arrangement of claim 17, further comprising:

while adjusting said antenna array for use in receiving antenna signals, said receivers and said transmitting means are arranged respectively for receiving payload data via said antennas at respective powers in respect to which said calibration code signals are maintained at a fixed level.

27. The arrangement of claim 16, wherein:

each said calibration code signal comprises a CDMA pilot signal.

28. The arrangement of claim 17, wherein:

each said calibration code signal comprises a CDMA pilot signal.

* * * * *